US008127343B2

(12) United States Patent
Asai

(10) Patent No.: US 8,127,343 B2
(45) Date of Patent: Feb. 28, 2012

(54) IMAGE FORMING SYSTEM, INFORMATION PROCESSING PROGRAM, AND IMAGE FORMING DEVICE HANDLING SECURE JOB INFORMATION

(75) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 976 days.

(21) Appl. No.: 12/055,629

(22) Filed: Mar. 26, 2008

(65) Prior Publication Data
US 2008/0243931 A1 Oct. 2, 2008

(30) Foreign Application Priority Data

Mar. 26, 2007 (JP) ................................. 2007-079935

(51) Int. Cl.
| G06F 7/04 | (2006.01) |
| G06F 3/12 | (2006.01) |
| G06F 15/16 | (2006.01) |
| G06K 15/00 | (2006.01) |
| G03G 15/00 | (2006.01) |
| G06F 21/24 | (2006.01) |
| G06F 21/20 | (2006.01) |
| B41J 5/30 | (2006.01) |
| B41J 29/38 | (2006.01) |

(52) U.S. Cl. ............ 726/5; 358/1.14; 358/1.15; 399/24; 709/229

(58) Field of Classification Search ..... 726/5; 358/1.15; 399/24; 709/229
See application file for complete search history.

(56) References Cited

U.S. PATENT DOCUMENTS
7,143,291 B1 11/2006 Shibata
(Continued)

FOREIGN PATENT DOCUMENTS
JP 2001-159963 A 6/2001
(Continued)

OTHER PUBLICATIONS

Fuwa, Y.; Maruyama, Y.; Kanazawa, H.; Komatsu, K.; Goshima, T.; Kunimune, H.; Niimura, M.; "A Secure Printing System for Ubiquitous Network"; TENCON 2005 2005 IEEE Region 10 Digital Object Identifier: 10.1109/Tencon.2005.300846 Publication Year: Feb. 2005, pp. 1-5.*

(Continued)

Primary Examiner — Eleni Shiferaw
Assistant Examiner — Courtney Fields
(74) Attorney, Agent, or Firm — Banner & Witcoff, Ltd.

(57) ABSTRACT

An image forming system includes an information processing device and an image forming device. The information processing device includes: a generator configured to generate secure job information including image forming information and image forming authentication information; and a transmitter configured to transmit the secure job information. The image forming device includes: a receiver configured to receive the secure job information; a storage configured to store the secure job information and deletion authentication information; an input unit configured to input image forming input information and deletion input information; an execution determining unit configured to determine, based on the image forming authentication information and the image forming input information, whether the image forming device executes an image forming process based on the image forming information; and a deletion determining unit configured to determine, based on the deletion authentication information and the deletion input information, whether the image forming device deletes the secure job information from the storage.

11 Claims, 10 Drawing Sheets

U.S. PATENT DOCUMENTS

| | | | |
|---|---|---|---|
| 2006/0221384 A1 * | 10/2006 | Tanaka | 358/1.15 |
| 2006/0268323 A1 | 11/2006 | Hashimoto | |
| 2007/0253013 A1 * | 11/2007 | Shudo | 358/1.14 |

FOREIGN PATENT DOCUMENTS

| | | | | |
|---|---|---|---|---|
| JP | 2003-226047 A | | 8/2003 | |
| JP | 2004-206636 | | 7/2004 | |
| JP | 2005-153144 | | 6/2005 | |
| JP | 2005-349694 | | 12/2005 | |
| JP | 2006-227832 A | | 8/2006 | |
| JP | 2006209198 A | * | 8/2006 | |
| JP | 2006-334803 A | | 12/2006 | |

OTHER PUBLICATIONS

JP Office Action dtd Jan. 28, 2009, JP Appln. 2007-079935, partial translation.

* cited by examiner

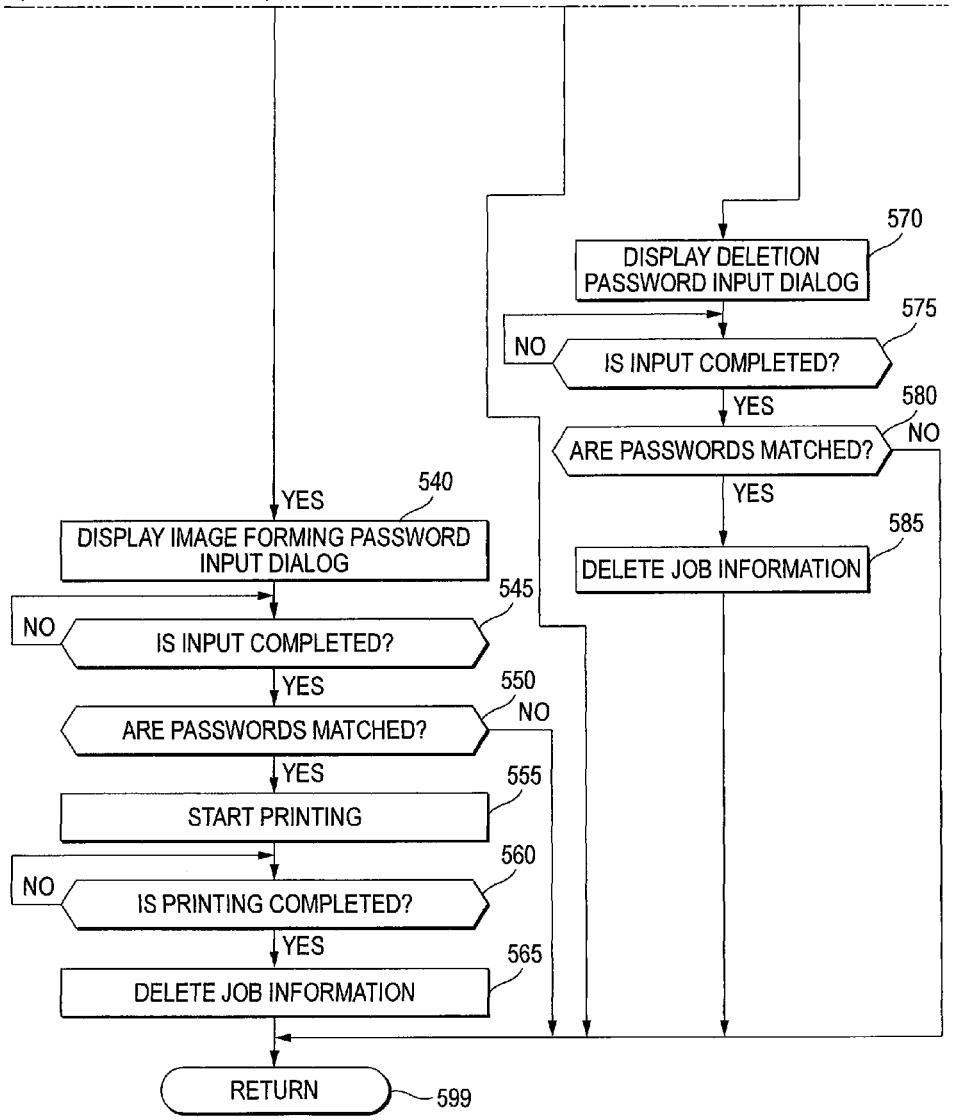

IMAGE FORMING SYSTEM, INFORMATION PROCESSING PROGRAM, AND IMAGE FORMING DEVICE HANDLING SECURE JOB INFORMATION

CROSS REFERENCE TO RELATED APPLICATION

The present disclosure relates to the subject matter contained in Japanese patent application No. 2007-079935 filed on Mar. 26, 2007, which is expressly incorporated herein by reference in its entirety.

TECHNICAL FIELD

The present invention relates to an image forming device which can prevent an image on a recording medium (for example, a document and a drawing printed on a sheet, etc.) from being viewed by an unspecified user. The present invention also relates to an image forming system including the image forming device, and an information processing device for transmitting secure job information including information indicative of the image to the image forming device. The present invention also relates to an information processing program for the image processing device.

BACKGROUND ART

An image forming system of this type is configured such that, when a user instructs an information processing device to transmit secure job information, the secure job information is transmitted from the information processing device to the image forming device. The image forming device stores (holds) the transmitted secure job information in a storage unit. The secure job information contains image forming information indicative of an image and authentication information (for example, information indicative of a password) set by the user.

When the user thereafter inputs input information (for example, information indicative of a password) using an input device of the image forming device, the image forming device specifies, from among the authentication information stored in the storage unit, the authentication information that matches the input information. When the user then instructs execution of printing through the input device, the image forming device forms an image on a recording medium based on the secure job information containing the specified authentication information. That is, the image forming device executes an image forming process (printing) based on the secure job information. After completion of the image forming process, the image forming device deletes the secure job information from the storage unit.

Accordingly, printing can be performed only when the user who can input the same input information as the authentication information stored in the storage unit is close to the image forming device. Because the secure printing is performed in this fashion, the image formed on the recording medium can be prevented from being viewed by an unspecified user.

When, for example, the user instructs the transmission of secure job information but thereafter does not desire to execute the image forming process based on the secure job information, the unnecessary secure job information is not deleted from the storage unit and thus remains stored therein.

To eliminate this situation, the image forming system is further configured such that, when the user inputs input information using the input device and then instructs deletion of the secure job information, the secure job information containing the authentication information specified by the input information is deleted from the storage unit. Secure job information that has become unnecessary can thus be prevented from being kept stored in the storage unit (see, for example, Japanese Patent Application Publication No. 2004-206636-A).

The image forming system, however, suffers from the following problem: That is, in a case where a large amount of secure job information has been already stored in the storage unit to make a remaining storage area too small, new secure job information, even if transmitted, can not be stored in the storage unit. Because a user, who is unable to input the input information the same as the stored authentication information, cannot instruct the image forming device to delete the stored secure job information, the user cannot perform a new secure printing job.

On the other hand, if the image forming system is configured to permit an unspecified user to delete any stored secure job information, the stored secure job information may be deleted meaninglessly even when the storage unit can store new secure job information.

SUMMARY

The present invention was made in view of the above-noted circumstances, and can provide, as an illustrative, non-limiting embodiment, an image forming system which includes an information processing device and an image forming device. The information processing device includes: a generator configured to generate secure job information including image forming information and image forming authentication information; and a transmitter configured to transmit the secure job information. The image forming device includes: a receiver configured to receive the secure job information; a storage configured to store the secure job information and deletion authentication information; an input unit configured to input image forming input information and deletion input information; an execution determining unit configured to determine, based on the image forming authentication information and the image forming input information, whether the image forming device executes an image forming process based on the image forming information; and a deletion determining unit configured to determine, based on the deletion authentication information and the deletion input information, whether the image forming device deletes the secure job information from the storage.

The present invention can provide, as another illustrative, non-limiting embodiment, a medium readable by an information processing device and having an information processing program stored thereon, wherein the program, when executed by the image processing device communicable with an image forming device, causes the image processing device to perform operations including the steps of: (a) generating secure job information including image forming information and image forming authentication information, wherein the image forming authentication information is to be used by the image forming device to determine whether the image forming device executes an image forming process based on the image forming information; (b) transmitting the secure job information to the image forming device; and (c) transmitting deletion authentication information to the image forming device, wherein the deletion authentication information is to be used by the image forming device to determine whether the image forming device deletes the secure job information therefrom.

The present invention can provide, as another illustrative, non-limiting embodiment, an image forming device including: a receiver configured to receive secure job information including image forming information and image forming authentication information; a storage configured to store the secure job information and deletion authentication information; an input unit configured to input image forming input information and deletion input information; an execution determining unit configured to determine, based on the image forming authentication information and the image forming input information, whether the image forming device executes an image forming process based on the image forming information; and a deletion determining unit configured to determine, based on the deletion authentication information and the deletion input information, whether the image forming device deletes the secure job information from the storage.

Accordingly, one of advantages of the present invention is to provide flexibility in handling secure job information by users.

Another one of the advantages of the present invention is to enable a secure job information transmitting user to securely protect an image of secure job information from being viewed by unspecified users.

Yet another one of the advantages of the present invention to enable a secure job information transmitting user to permit appropriate users to delete secure job information.

These and other advantages of the present invention will be discussed in detail with reference to the accompanying drawings.

DESCRIPTION OF THE PREFERRED EMBODIMENT

Illustrative, non-limiting embodiments of the present invention will now be described with reference to the drawings.

First Example

Figure 1:
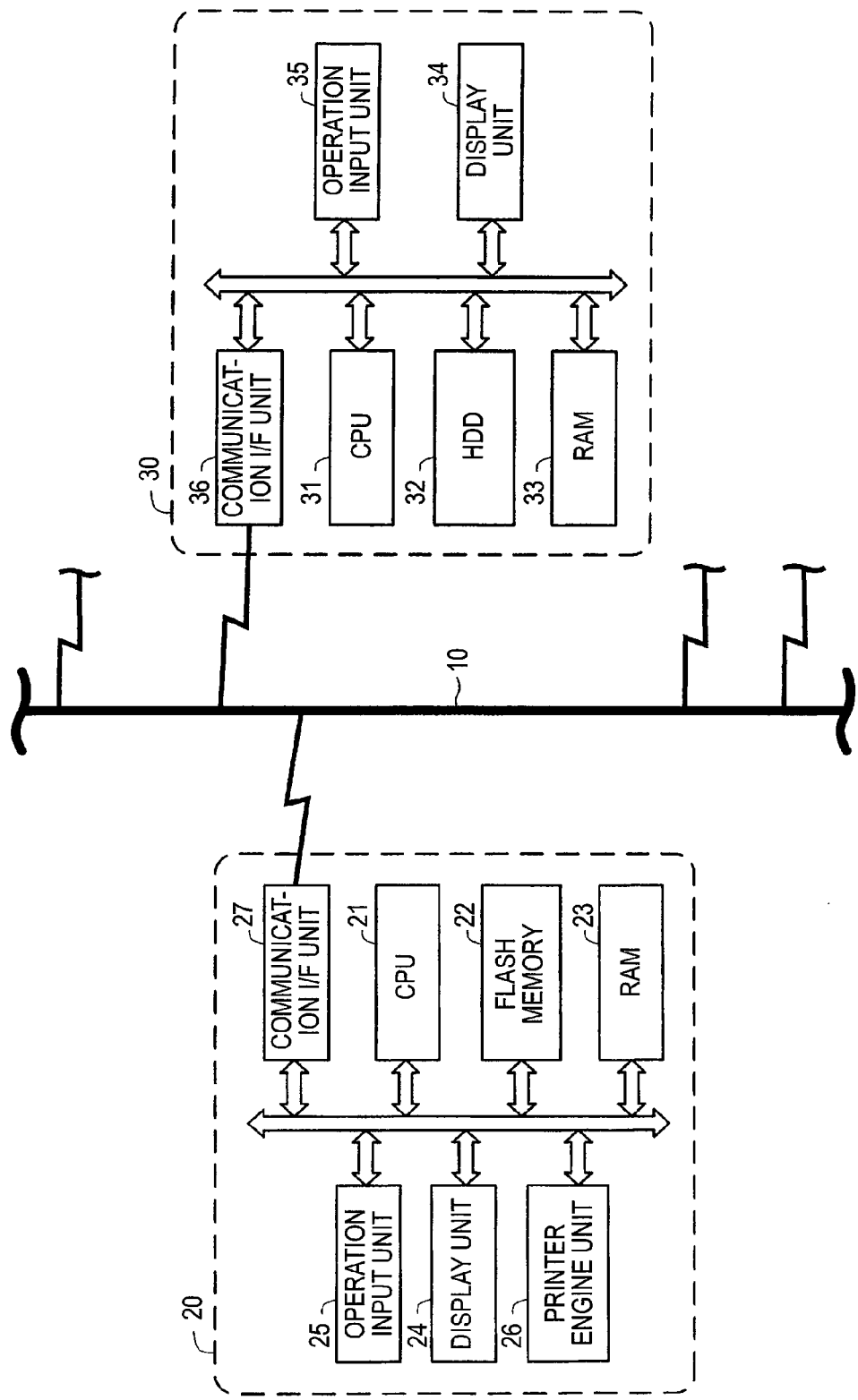
FIG. 1 is a block diagram of a general arrangement of an image forming system of a first example.

As shown in FIG. 1, an image forming system according to a first example includes an image forming device 20 and a plurality of information processing devices (terminal devices) 30, connected via a communication line (in the present example, a local area network) 10.

(Image Forming Device)

The image forming device 20 can be constructed, for example, by a laser printer. The image forming device 20 includes a CPU 21, a flash memory 22, a RAM 23, a display unit 24, an operation input unit 25, a printer engine unit 26, and a communication interface unit 27, which are connected to each other via a bus.

The CPU 21 can transmit various instruction information to respective components of the image forming device 20 by executing a predetermined program.

The flash memory 22 is a storage medium which can store (hold) information (data) therein and delete the stored information therefrom while a power supply is in an on state (readable/writable storage medium). When the power supply is in an off state, the flash memory 22 continues to store the stored information. A program for operating the image forming device 20, etc. are stored in the flash memory 22.

The RAM 23 is a readable/writable storage medium. The RAM 23 can store information only when the power supply is in the on state.

The display unit 24 includes an unillustrated display panel (in the present example, a liquid crystal panel). The display unit 24 can display an image, including a message for notifying a user of information, an input column for allowing the user to input information, etc., on the display panel according to instructions from the CPU 21.

The operation input unit 25 has a plurality of keys (buttons), including a "Δ" key, a "∇" key, an "OK" key, a "Secure" key, and numeric keys, "0" to "9." The operation input unit 25 is arranged so that when a key is pressed, information corresponding to the pressed key is input. The information corresponding to each key is set in association with the image displayed on the display unit 24. The operation input unit 25 may include the display panel of the display unit 24, which the user can directly touch to input information.

The printer engine unit 26 includes a photosensitive drum having a circumferential surface on which an electrostatic latent image can be formed by illumination of a laser light, a scanner unit for generating and scanning the laser light on the circumferential surface of the photosensitive drum based on image forming information, and a developer supplying unit for supplying a charged developer to the circumferential surface of the photosensitive drum. The printer engine unit 26 can execute, based on image forming information received from an information processing device 30, an image forming process of forming an image on a recording medium, such as a sheet, by the developer.

The communication interface unit 27 has an interface (in the present example, an interface via a communication cable), connectable to the communication line 10. The communication interface unit 27 can transmit information from the information processing devices 30 and receive information from the information processing devices 30 in a state of being connected to the communication line 10. The communication interface unit 27 has a buffer memory (not illustrated), which is a readable/writable memory that temporarily stores the received information. The communication interface unit 27 may be connected to the communication line 10 by a wireless system instead of via the communication cable.

(Information Processing Device)

Each of the information processing devices 30 (one device 30 is shown in FIG. 1) can be constructed, for example, by a personal computer. Each information processing device 30 has a CPU 31, a hard disk drive (HDD) 32, a RAM 33, a display unit 34, an operation input unit 35, and a communication interface unit 36 that are connected to each other via a bus.

The CPU 31 executes a predetermined program so that the information processing device 30 execute various operations.

Figure 3:
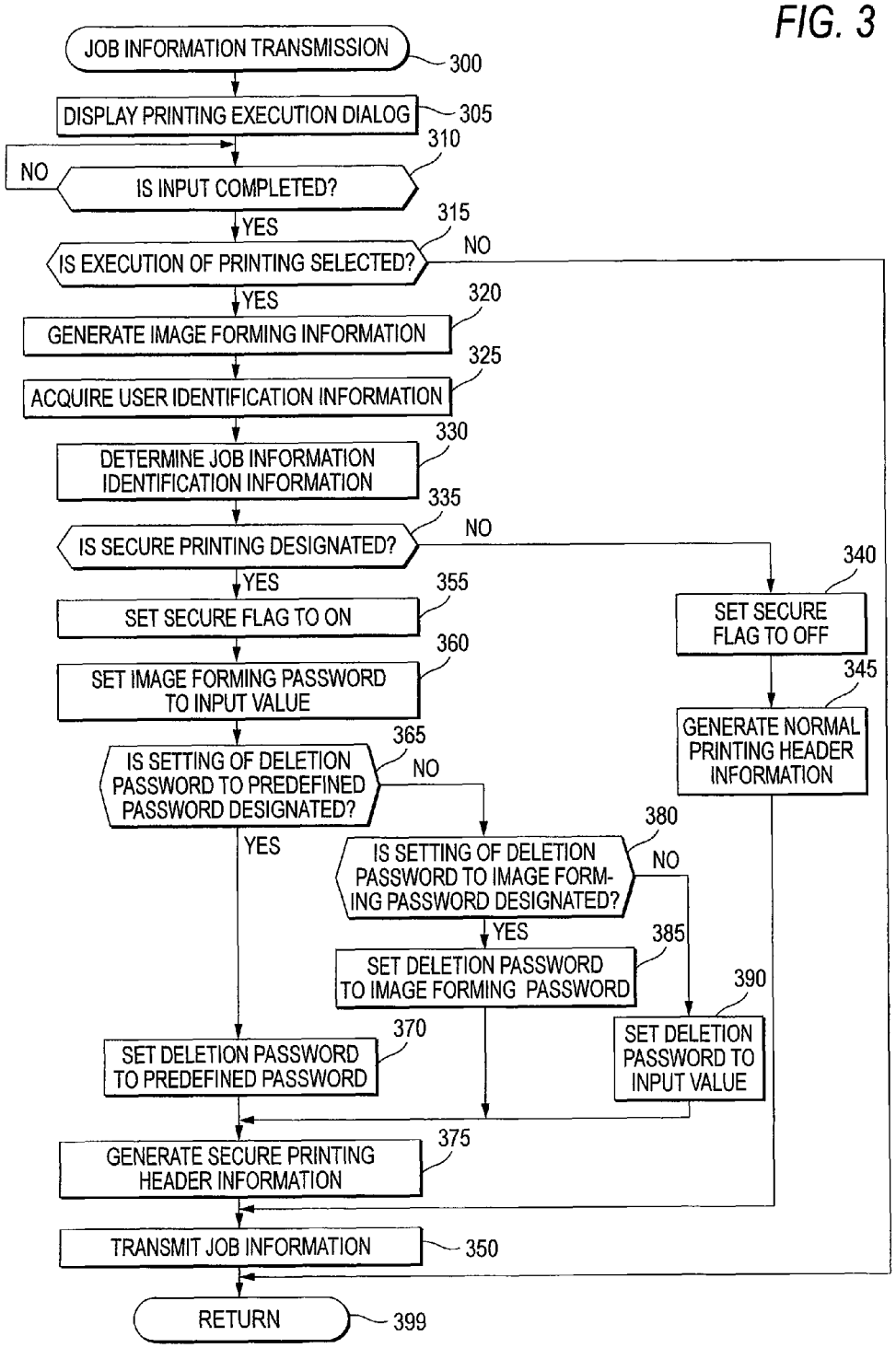
FIG. 3 is a flowchart of a program for transmitting job information, executed by a CPU of an information processing device shown in FIG. 1.

The HDD 32 is a readable/writable recording medium. The HDD 32 can continue to store stored information when a power supply is in an off state. The HDD 32 stores therein various programs, data, etc., including a system program for realizing basic functions that the respective components of the information processing device 30 have (for example, input of information by operation of a keyboard or a mouse, display of an image by a display, etc.). An information processing program to be discussed later with reference to, for example, FIG. 3, is stored in the HDD 32. The program may be preliminarily stored in the HDD 32, or may be delivered from a medium, such as a floppy diskette, CD, DVD, a removable memory and a signal transmitted via a network, to the image processing device to be installed (stored) in the HDD 32. These programs are executed by the CPU 31.

The RAM 33 is a readable/writable storage medium. The RAM 33 can store information only when the power supply is in the on state.

The display unit 34 includes an unillustrated display having a display panel (in the present example, a liquid crystal panel). The display unit 34 can display an image, including a message for notifying the user of information, an input column for allowing the user to input information, etc., on the display panel according to instructions from the CPU 31.

The operation input unit 35 has an unillustrated keyboard, including numeric keys, "0" to "9," and an unillustrated mouse. The operation input unit 35 is arranged so that when a key of the keyboard is pressed, a click button of the mouse is pressed (the mouse is clicked) or the mouse is moved, information set according to each operation is input in accordance with the image displayed on the display unit 34. The operation input unit 35 can transmit the input information to the CPU 31.

(Outline of Operations)

Operations of the image forming system will now be described in outline.

An information processing device 30 of the image forming system transmits, in accordance with an instruction of a user UA, normal job information, which is job information including image forming information, to the image forming device 20. Upon receiving the normal job information, the image forming device 20 immediately executes the image forming process based on the image forming information contained in the received normal job information.

The information processing device 30 also transmits, in accordance with an instruction of the user UA, secure job information to the image forming device 20. The secure job information includes image forming information, image forming authentication information, and deletion authentication information. The image forming authentication information corresponds to image forming input information that only the user UA can input. In the present example, the image forming authentication information is image forming password information indicative of a character string that only the user UA knows (that is, only the user UA can input). The deletion authentication information corresponds to deletion input information that only a plurality of users UA to UE in a group, to which the user UA is a member, can input. In the present example, the deletion authentication information is deletion password information indicative of a character string known by the users UA to UE.

Upon receiving the secure job information, the image forming device 20 stores (holds) the received secure job information in the RAM 23. When the user UA thereafter uses the operation input unit 25 to input, into the image forming device 20, information, instructing execution of the image forming process based on the stored secure job information, and the image forming password information, the image forming device 20 executes the image forming process based on the image forming information included in the secure job information. Secure printing is thereby executed.

When any of the users UA to UE uses the operation input unit 25 to input, into the image forming device 20, information, instructing deletion of the stored secure job information, and the deletion password information, the image forming device 20 deletes the secure job information.

Thus, even if, for example, secure job information transmitted by the user UA makes a storage space of the RAM 23 too small to store new secure job information therein, another user among the users UB to UE, who desires to perform a new secure printing job, can delete the secure job information transmitted by the user UA, from the RAM 23 to perform the new secure printing job.

That is, the image forming system can prevent an image, formed on a recording medium (sheet) when the image forming process is executed, from being viewed by an unspecified user other than a job transmitting user (the user who instructs transmission of the secure job information), and yet enables specific users other than the job transmitting user to delete the stored secure job information from the image forming device 20. Because the information amount that the image forming device 20 can store anew can thus be increased, continuation of a state, in which the image forming device 20 cannot perform a new secure printing job, can be avoided.

(Details of the Operations)

Details of the operations of the image forming system shall now be described with reference to FIGS. 2 to 11.

Figure 2:
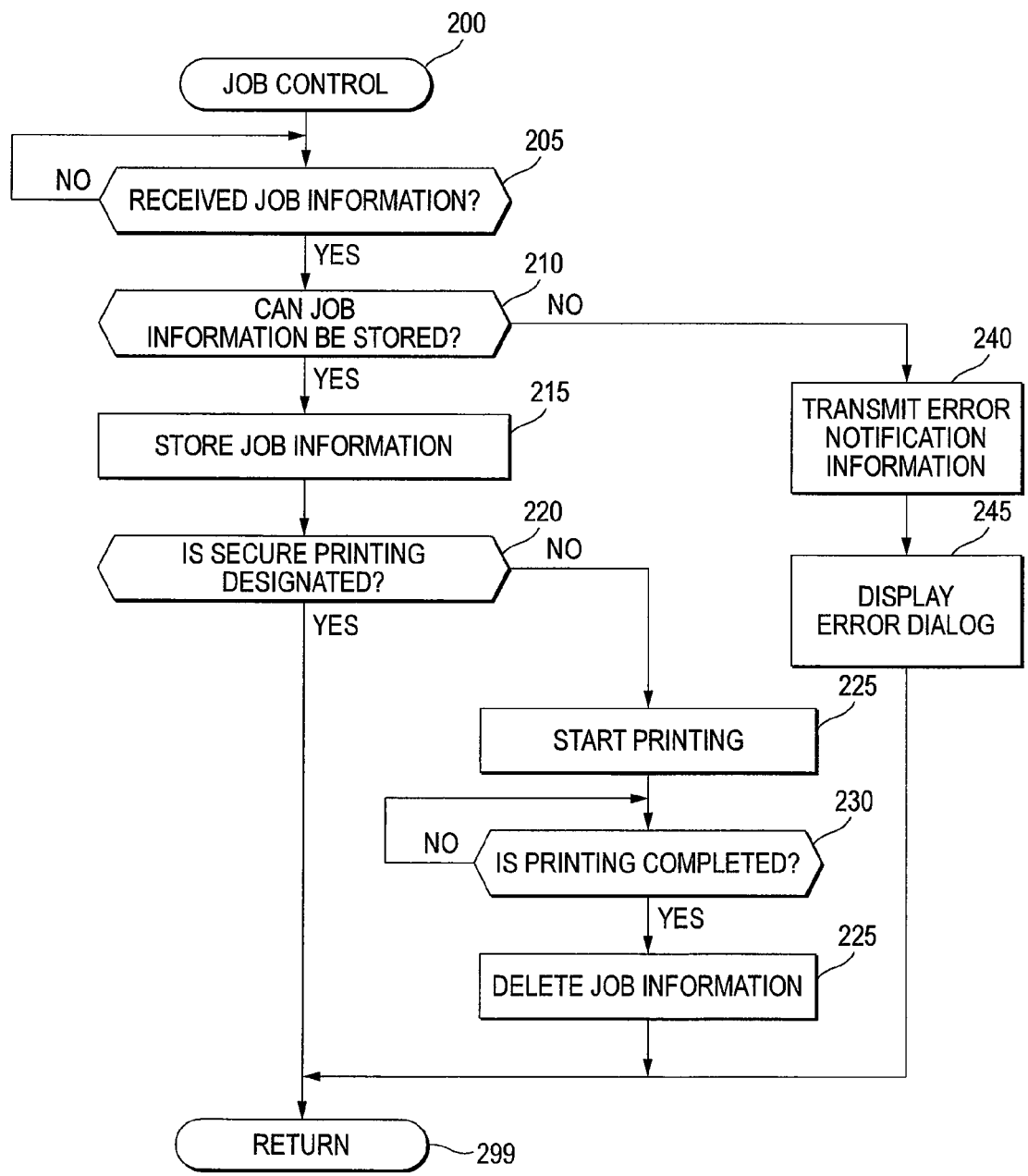
FIG. 2 is a flowchart of a program for performing job control, executed by a CPU of an image forming device shown in FIG. 1.

The CPU 21 (see FIG. 1) of the image forming device 20 starts a process of a job control routine for performing job control, illustrated by a flowchart in FIG. 2, at each elapse of a predetermined time and when the job control routine is not already being executed.

Thus, at the predetermined timing, the CPU 21 starts the process from step 200, and upon entering step 205, determines whether job information has been received. In a case in which the image forming device 20 has not received job information, the CPU 21 makes a "No" determination at step 205 and stands by in step 205 until job information is received.

In order to print out a desired image in an application software (for example, a word processing software, drawing software, etc.) being executed by the information processing device 30, the user UA can operate the keyboard or the mouse of the operation input unit 35 (and, for example, selects "Print" in a menu) to input printing instruction information that instructs printing.

Upon receiving the printing instruction information, the CPU 31 of the information processing device 30 starts execution of a job information transmission routine for transmitting job information, illustrated in a flowchart in FIG. 3. The CPU 31 thus starts the process from step 300 and upon entering step 305, controls the display panel of the display unit 34 to display thereon a printing execution dialog 400 shown in FIG. 4.

The printing execution dialog 400 has a secure printing designation checkbox (secure printing designation CB) 401, an image forming password input box (image forming password IB) 402, deletion password selection radio buttons (deletion password selection RBs) 403 to 405, a deletion password input box (deletion password IB) 406, a print button 407, and a cancel button 408.

The secure printing designation CB 401 can be switched, by operation of the mouse or the keyboard, between a selected state (checked state) and an unselected state (unchecked state).

The image forming password IB 402 can be switched, by operation of the mouse or the keyboard, between an input-enabled mode and an input-disabled mode. When the input-enabled mode is set, the user can input into the image forming password IB 402 password information indicative of a character string constituted of "0" to "9" by pressing the numeric keys "0" to "9" of the keyboard of the operation input unit 35. Input boxes that are described below operate in the same manner.

The deletion password selection RBs 403 to 405 are arranged so that, by operation of the mouse or the keyboard, just one of the deletion password selection RBs 403 to 405 is selected (selected alternatively).

The deletion password IB 406 is arranged, like the image forming password IB 402, for input of password information therein.

The print button 407 is arranged so that, by operation of the mouse or the keyboard, an action of depressing the print button 40 is displayed (also expressed hereinafter as "the print button 407 is depressed"). The cancel button 408 acts in the same manner.

The printing execution dialog 400 generates information, indicating that printing is to be executed, when the print button 407 is depressed. When the print button 407 is depressed with the secure printing designation CB 401 in the selected state, the printing execution dialog 400 furthermore generates, information indicating that secure printing is designated, and the password information input into the image forming password IB 402.

In this connection, when the deletion password selection RB 403 is in the selected state, the printing execution dialog 400 generates selection information indicating that the deletion password information is set to predefined password information. When the deletion password selection RB 404 is in the selected state, the printing execution dialog 400 generates selection information indicating that the deletion password information is set to the image forming password information (the password information input in the image forming password IB 402). When the deletion password selection RB 405 is in the selected state, the printing execution dialog 400 generates selection information indicating that the deletion password information is set to input password information (password information input in the deletion password IB 406), and the password information input in the deletion password IB 406.

When in the state where the image forming password IB 402 is set in the input-enabled mode, the print button 407 is depressed without any of the numeric keys "0" to "9" of the keyboard of the operation input unit 35 having been pressed, password information, indicating a null character string that does not contain any symbols, is generated as the password information input into the image forming password IB 402. Likewise, when in the state where the deletion password IB 406 is set in the input-enabled mode, the print button 407 is depressed without any of the numeric keys "0" to "9" of the keyboard of the operation input unit 35 having been pressed, password information, indicating a null character string that does not contain any symbols, is generated as the password information input into the deletion password IB 406.

When the print button 407 is depressed with the secure printing designation checkbox 401 being in the unselected state, the printing execution dialog 400 generates information indicating that secure printing is not designated.

The printing execution dialog 400 generates, upon depression of the cancel button 408, information indicating that printing is not to be executed.

As shown in FIG. 3, upon completion of display of such a printing execution dialog 400, the CPU 31 enters step 310 and determines whether the user UA has completed input of information based on the printing execution dialog 400. In a case in which the printing execution dialog 400 has generated neither information indicating that printing is to be executed nor information indicating that printing is not to be executed, the CPU 31 makes the "No" determination in step 310 and stands by in step 310 until the input of information by the user UA is completed.

(Normal Printing)

First, a case where, in a state in which the information amount that can be stored anew in the RAM 23 of the image forming device 20 is comparatively high, the user UA desires to perform printing (normal printing) that does not require input of predetermined image forming input information at a start of printing shall be described. In this case, the user UA depresses the print button 407 with the secure printing designation CB 401 being in the unchecked state (unselected state).

The CPU 31 thereby receives the information indicating that secure printing is not designated and the information indicating that printing is to be executed. In this case, the CPU 31 makes a "Yes" determination in step 310 and enters step 315 to end the display of the printing execution dialog 400 and determines whether execution of printing was selected in the printing execution dialog 400 (that is, whether the print button 407 was depressed or the cancel button 408 was depressed).

Because the information indicating that printing is to be executed has been input, the CPU 31 makes the "Yes" determination in step 315 and enters step 320 to generate image forming information. The image forming information is information (data) that indicates an image the user UA wants to print and that is necessary for the image forming device 20 to print the image.

The CPU 31 then enters step 325 and acquires user identification information (in the present example, information indicating a user ID, input by a user when use of an information processing device 30 is started, and here, the information indicating "User A") for enabling the image forming device 20 to identify the user who is transmitting the job information.

The CPU 31 then enters step 330 and determines job information identification information (in the present example, information indicating a job ID, which is a unique number added to job information transmitted from an information processing device 30, and here, the information indicating "#314") for enabling the image forming device 20 to identify the job information.

The CPU 31 then enters step 335 and determines whether secure printing is designated. In the present case, because the CPU 31 receives information indicating that secure printing is not designated as mentioned above, the CPU 31 makes the "No" determination in step 335 and enters step 340 to set secure flag information to off information.

Here, the secure flag information is flag information indicating whether the job information is secure job information or normal job information, and when set to on information, indicates that secure printing is designated (that the job information is secure job information) and when set to the off information, indicates that secure printing is not designated (that the job information is normal job information).

The CPU 31 then enters step 345 and generates normal printing header information. The normal printing header information includes the secure flag information, set in step 340, the user identification information (information indicating "User A"), acquired in step 325, the job information identification information (information indicating "#314"), determined in step 330, and terminal device identification information (in the present example, an IP address) for enabling the image forming device 20 to specify (identify) the information processing device that transmitted the job information.

The CPU 31 then enters step 350 to generate job information (in the present case, normal job information) by adding the image forming information, generated in step 320, to the end of the header information (in the present case, normal printing header information), generated in step 345, and transmit the generated job information to the image forming device 20. The CPU 31 then enters step 399 and ends the present routine once.

The image forming device 20 thereby receives the job information transmitted from the information processing device 30. The CPU 21 of the image forming device 20 then makes the "Yes" determination in step 205 of the job control routine of FIG. 2 and enters step 210 to determine whether the information amount that the RAM 23 can store anew is greater than an information amount of the received job information stored in the buffer memory of the communication interface unit 27.

In the present case, since the information amount that the RAM 23 can store anew is sufficiently greater than the information amount of the received job information, the CPU 21 makes the "Yes" determination in step 210 and enters step 215 to store the received job information in the RAM 23 and delete the job information from the buffer memory.

The CPU 21 then enters step 220 and determines whether secure printing is designated. In the present case, the secure flag information, included in the header information, is set to the off information that expresses that secure printing is not designated.

The CPU 21 thus makes the "No" determination in step 220 and enters step 225 to transmit, to the printer engine unit 26, instruction information for executing an image forming process based on the image forming information included in the job information stored in the RAM 23 in step 215. The printer engine unit 26 thus starts execution of the image forming process based on the image forming information (printing).

The CPU 21 then enters step 230 to wait for completion of printing, and when printing is completed, enters 235 and deletes the job information, which was stored in the RAM 23 in step 215 (that is, the job information including the image forming information that became the base for the completed printing), from the RAM 23. The CPU 21 then enters step 299 and end the present routine once.

Thus, when job information (normal job information), with which secure printing is not designated, is transmitted (when normal printing is instructed), the image forming device 20 performs printing immediately after receiving the job information.

Figure 4:
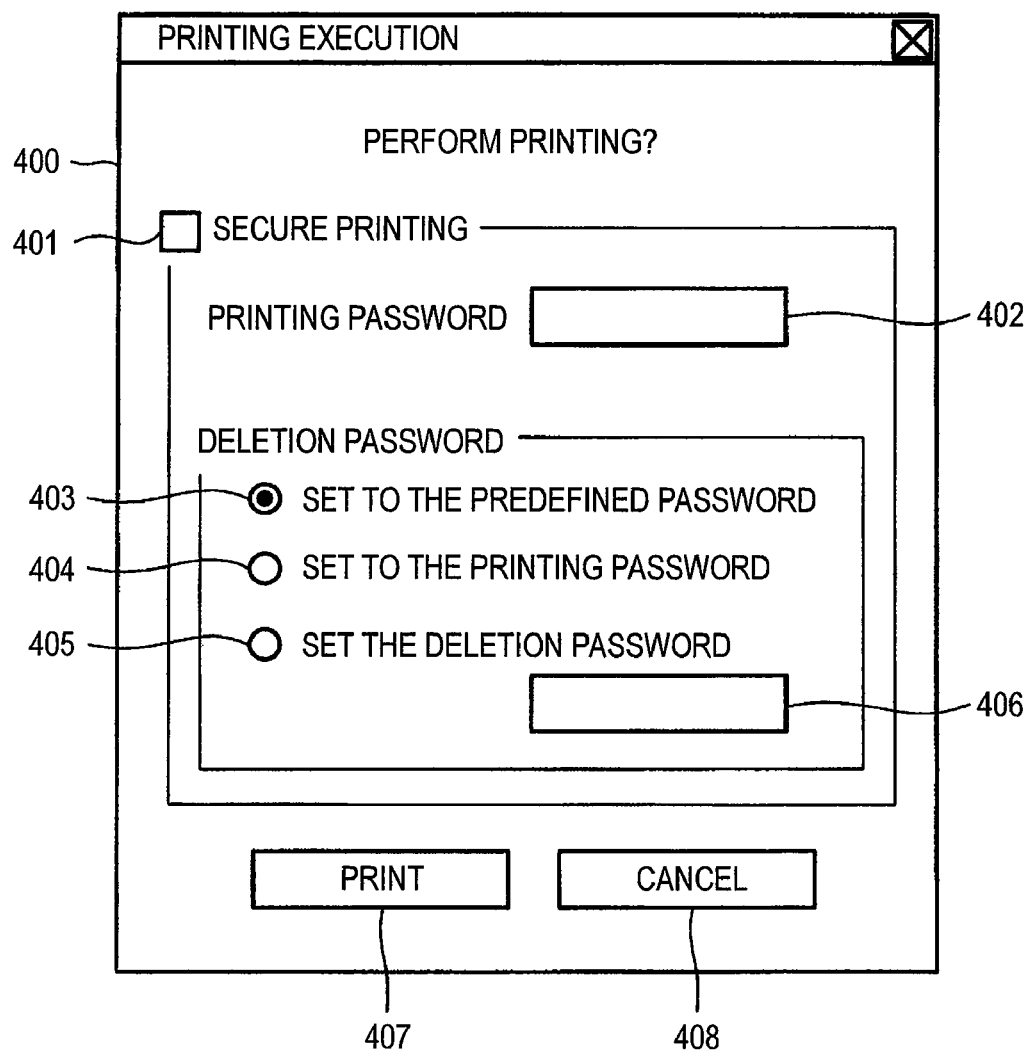
FIG. 4 is a diagram of an image, displayed on a display unit of the information processing device shown in FIG. 1 and prompting a user to select whether to execute printing or not.

If the user UA depresses the cancel button 408 in the printing execution dialog box 400 of FIG. 4, the CPU 31 of the information processing device 30, upon entering step 315 of the job information transmission routine of FIG. 3, makes the "No" determination in step 315 and enters step 399 directly to end the present routine once without transmitting the job information. Because the job information is thus not transmitted, printing is not performed.

(Secure Printing)

Next, a case where, in a state in which the information amount that can be stored anew in the RAM 23 of the image forming device 20 is comparatively high, the user UA desires to perform secure printing and desires to set the deletion password information to predefined password information shall be described.

In this case, the user UA sets the secure printing designation CB 401 to the selected state when the printing execution dialog 400 of FIG. 4 is displayed on the display panel of the display unit 34. Furthermore, the user UA inputs, into the image forming password IB 402, password information indicating a character string that is constituted of symbols, including characters and numerals, and is a character string known only to the user UA (in the present example, "916437"). Further, the user UA sets the deletion password selection RBs 403 to 405 to the state where the deletion password selection RB 403 is selected (that is, the state in which the setting of the deletion password information to the predefined password information is instructed). The user UA then depresses the print button 407 in this state.

The CPU 31 of the information processing device 30 thereby receives the information indicating that printing is to be executed, the information indicating that secure printing is designated, the password information input into the image forming password IB 402 (in the present example, the information indicating "916437"), and the selection information indicating the setting of the deletion password information to the predefined password information.

Thus, upon entering step 335 of the job information transmission routine of FIG. 3, the CPU 31 makes the "Yes" determination in step 335 and enters step 355 to set the secure flag information to the on information indicating that secure printing is designated.

The CPU 31 then enters step 360 and sets the image forming password information to the password information (input value) input in the image forming password IB 402. The execution of the process of step 360 corresponds to realization of a portion of functions of a first transmission unit.

The CPU 31 then enters step 365 and determines whether setting of the deletion password information to the predefined password information is designated.

In the present case, because the CPU 31 has received the selection information indicating that the deletion password information is to be set to the predefined password information, the CPU 31 makes the "Yes" determination in step 365 and enters step 370 to set the deletion password information to the predefined password information (in the present example, information indicating "1234"). The predefined password information is stored in advance in the HDD 32 of the information processing device 30 and can be changed by an unillustrated printing setting dialog box displayed by the display unit 34. In the present example, all of the information processing devices 30 store the same predefined password information. Also, the users UA to UE know the character string (in the present example, "1234") defined by the predefined password information. The execution of the respective processes of step 365 and step 370 corresponds to realization of a portion of functions of a second transmission unit.

The user UA can thereby set the deletion authentication information to the predefined password information without having to input password information in the deletion password IB 406. The user UA is thus free from inputting the password information. The setting of the deletion authentication information to password information that is not intended by the user UA due to input error by the user UA, etc., can also be prevented. The user UA can also use the information processing device 30 to set the deletion authentication information to be set in the image forming device 20. User convenience can thus be improved.

Thereafter, the CPU 31 enters step 375 and generates secure printing header information. The secure printing header information includes the secure flag information, set in step 355, the user identification information (information indicating "User A"), acquired in step 325, the job information identification information (information indicating "#315"), determined in step 330, the terminal device identification information (in the present example, an IP address), the image forming password information (information indicating "916437"), which is the image forming authentication information set in step 360, and the deletion password information (information indicating "1234"), which is the deletion authentication information set in step 370.

The CPU 31 then enters step 350 to generate job information (in the present case, secure job information) by adding the image forming information, generated in step 320, to the end of the header information (in the present case, secure printing header information), generated in step 375, and transmit the generated job information to the image forming device 20. The CPU 31 then enters step 399 and ends the present routine once. The execution of the respective processes of step 375 and step 350 corresponds to realization of a portion of the functions of the first transmission unit and a portion of the functions of the second transmission unit.

The image forming device 20 thereby receives the secure job information transmitted from the information processing device 30. The CPU 21 of the image forming device 20 thus enters step 215 of FIG. 2 to make the secure job information be stored in the RAM 23, and thereafter, upon entering step 220 and making the "Yes" determination, enters step 299 directly and ends the job control routine once.

A state, where the user UA has transmitted a plurality of secure job information, having "#315" to "#318" attached as job IDs, from the information processing device 30 to the image forming device 20 and each of the users UB to UD has also transmitted secure job information from an information processing device 30 to the image forming device 20, shall now be considered. The description shall now be continued for a case where, in the above state, the user UA desires to use the image forming device 20 to execute the image forming process based on the image forming information included in the secure job information, having "#316" attached as the job ID.

In this case, the user UA presses the "Secure" key of the operation input unit 25 of the image forming device 20.

The CPU 21 of the image forming device 20 thereby receives information corresponding to the "Secure" key from the operation input unit 25. The CPU 21 starts, upon receiving the information, execution of a secure job control routine for performing a secure job control illustrated in a flowchart in FIG. 5. The CPU 21 thus starts the process from step 500 and upon entering step 505, controls the display panel of the display unit 24 to display thereon a user selection dialog 600 shown in FIG. 6.

The user selection dialog 600 has a user ID list box (user ID LB) 601. All of the user identification information, included in the secure job information stored in the RAM 23, are displayed one user identification information at a time (without overlapping) in the user ID LB 601 (here, the "User A" to "User D," which are the user IDs, are displayed). The user ID LB 601 is arranged so that one of the displayed user IDs is selected at all times.

The user ID LB 601 is arranged so that the selected user ID can be changed by pressing the "Δ" key or the "∇" key of the operation input unit 25. The user ID LB 601 generates information indicating the selected user ID when the "OK" key of the operation input unit 25 is pressed. Other list boxes in dialog boxes described below that are displayed by the display unit 24 operate in the same manner.

The CPU 21 then enters step 510 and determines whether the user UA has completed a user selection based on the user selection dialog 600. In a case in which the user selection dialog 600 has not generated information indicating a user ID (the user selection is not completed), the CPU 21 makes the "No" determination in step 510 and stands by in step 510 until the user selection is completed.

Figure 7:
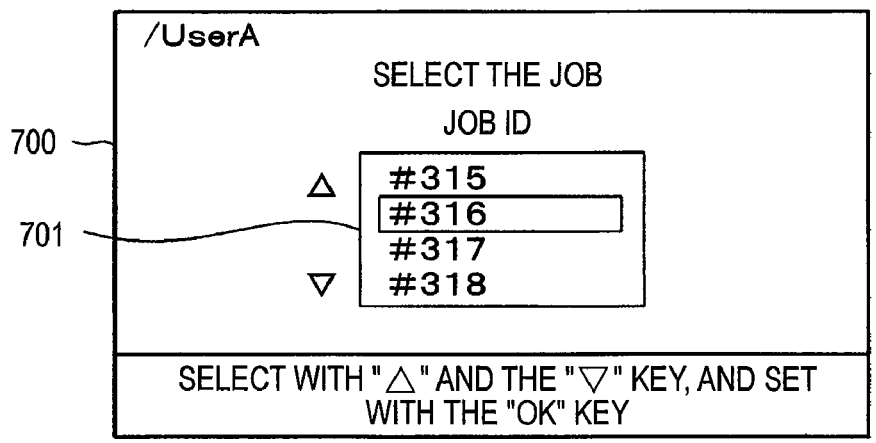
FIG. 7 is a diagram of an image, displayed on the display unit of the image forming device shown in FIG. 1 and prompting a user to select a job ID.

When the user UA sets the user ID LB 601 to the state where his/her own user ID, "User A," is selected and thereafter presses the "OK" key, the CPU 21 receives the information indicating the selected user ID, "User A." The CPU 21 thus makes the "Yes" determination in step 510 and enters step 515 to end the display of the user selection dialog 600 and control the display panel of the display unit 24 to display thereon a job selection dialog 700 shown in FIG. 7.

The job selection dialog 700 has a job ID list box (job ID LB) 701. The job ID LB 701 displays job information identification information (here, the job IDs "#315" to "#318") that are included in the secure job information, which, among the secure job information stored in the RAM 23, include the user identification information indicating the received user ID (here, "User A").

The CPU 21 then enters step 520 and determines whether the user UA has completed a job selection based on the job selection dialog 700. In a case where the user selection dialog 700 has not generated information indicating a job ID (the job selection is not completed), the CPU 21 makes the "No" determination in step 520 and stands by in step 520 until the job selection is completed.

Figure 8:
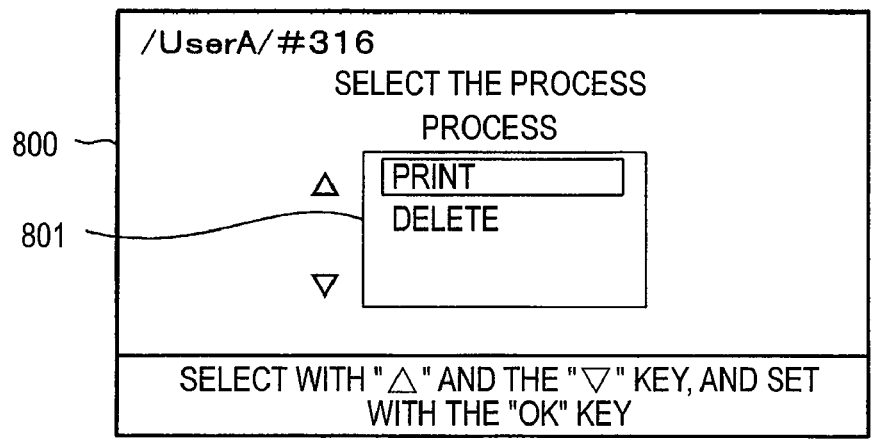
FIG. 8 is a diagram of an image, displayed on the display unit of the image forming device shown in FIG. 1 and prompting a user to select a process.

When the user UA sets the job ID LB 701 to the state where the job ID, "#316," is selected and thereafter presses the "OK" key, the CPU 21 receives the information indicating the selected job ID, "#316." The CPU 21 thus makes the "Yes" determination in step 520 and enters step 525 to end the display of the job selection dialog 700 and control the display panel of the display unit 24 to display thereon a process selection dialog 800 shown in FIG. 8.

The process selection dialog 800 has a process list box (process LB) 801. The process LB 801 displays a list of selectable processes (in the present example, "Print" and "Delete").

The CPU 21 then enters step 530 and determines whether the user UA has completed a process selection based on the process selection dialog 800. In a case in which the process selection dialog 800 has not generated information indicating a process (the process selection is not completed), the CPU 21 makes the "No" determination in step 530 and stands by in step 530 until the process selection is completed.

When the user UA sets the process LB 801 to a state where "Print" is selected and thereafter presses the "OK" key, the CPU 21 receives the information indicating that the printing process (image forming process) has been selected. The CPU 21 thus makes the "Yes" determination in step 530 and enters step 535 to end the display of the process selection dialog 800 and determines whether the printing process has been selected in the process selection dialog 800 (that is, whether "Print" has been selected or "Delete" has been selected).

Figure 9:
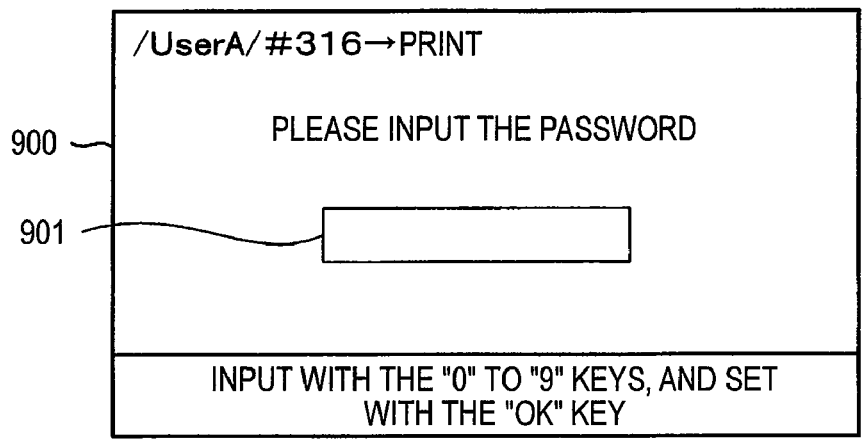
FIG. 9 is a diagram of an image, displayed on the display unit of the image forming device shown in FIG. 1 and prompting a user to input image forming password information.

Because in this case, the information indicating that the printing process has been selected is input, the CPU 21 makes the "Yes" determination in step 535 and enters step 540 to control the display panel of the display unit 24 to display thereon an image forming password input dialog 900 shown in FIG. 9.

The image forming password input dialog 900 has an image forming password input box (image forming password IB) 901. The image forming password IB 901 is arranged so that password information indicating a character string, constituted of "0" to "9," can be input by the pressing of the numeric keys, "0" to "9" of the operation input unit 25.

The image forming password input dialog 900 generates, upon pressing of the "OK" key of the operation input unit 25, information on the input password. When the "OK" key is pressed without any of the numeric keys "0" to "9" of the operation input unit 25 having been pressed, the input password information indicates the null character string. Other input boxes in dialog boxes described below that are displayed by the display unit 24 operate in the same manner.

The CPU 21 then enters step 545 and determines whether the user UA has completed input of information based on the image forming password input dialog 900. In a case in which the image forming password input dialog 900 has not generated password information (the input of information is not completed), the CPU 21 makes the "No" determination in step 545 and stands by in step 545 until the input of information is completed.

When the user UA inputs, as the image forming input information, the same password information (in the present example, the information indicating "916437") as the password information input in the image forming password IB 402 of the printing execution dialog 400 of FIG. 4, and thereafter presses the "OK" key, the CPU 21 receives the password information. The CPU 21 thus makes the "Yes" determination in step 545 and enters step 550 to end the display of the image forming password input dialog 900. The CPU 21 furthermore determines whether the password information (image forming input information), input based on the image forming password input dialog 900, matches the image forming authentication information included in the secure job information (selected secure job information), which among the secure job information stored in the RAM 23, includes the user identification information, indicating the user ID, "User A," selected based on the user selection dialog 600, and the job information identification information, indicating the job ID, "#316," selected based on the job selection dialog 700.

When the image forming input information and the image forming authentication information are matched, the CPU 21 makes the "Yes" determination in step 550 and enters step 555 to transmit, to the printer engine unit 26, instruction information for executing the image forming process based on the image forming information included in the secure job information. The printer engine unit 26 thus starts execution of the image forming process based on the image forming information (printing).

The CPU 21 then enters step 560 to wait for completion of printing, and when the printing is completed, enters step 565 to delete the selected secure job information (the job information including the image forming information that became the base of the completed printing) from the RAM 23. Execution of the respective processes from step 540 to step 565 corresponds to realization of functions of an execution determining unit.

The CPU 21 then enters step 599 and ends the present routine once.

If the password information (image forming input information), input based on the image forming password input dialog 900 of FIG. 9, does not match the image forming authentication information, included in the selected secure job information, the CPU 21 of the image forming device 20, upon entering step 550, makes the "No" determination in step 550 and then directly enters step 599 to end the present routine once without performing the image forming process. The image forming authentication information can be considered as information defining the image forming input information to be input by a user into the image forming device 20 when the user uses the image forming device 20 to execute the image forming process.

Because the image forming process (printing) based on the secure job information transmitted by the user UA is thus performed (secure printing is performed) only when the user UA is close to the image forming device 20, the image formed on the recording medium can be prevented from being viewed by an unspecified user.

A case, where the user UA no longer desires the image forming process, based on the secure job information transmitted from the information processing device 30 to the image forming device 20 (in the present example, the secure job information having "#317" attached as the job ID), and the user UA therefore desires deletion of the secure job information, shall now be described.

Figure 6:
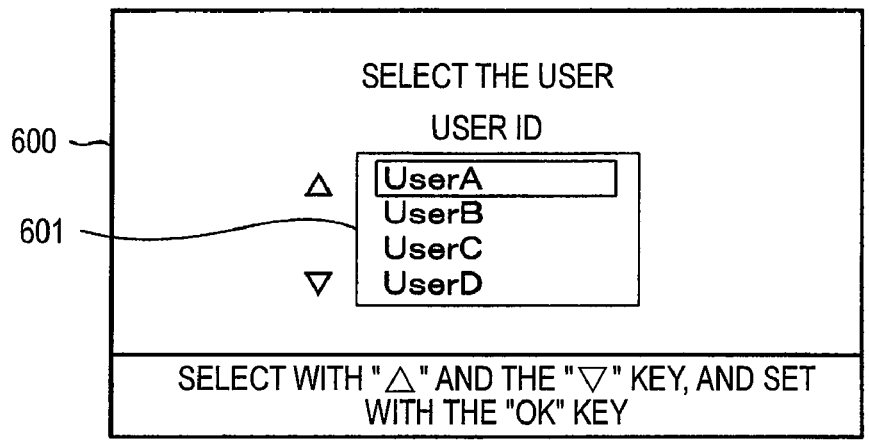
FIG. 6 is a diagram of an image, displayed on a display unit of the image forming device shown in FIG. 1 and prompting a user to select a user ID.

In this case, the user UA, as in the above-described cases, selects his/her own user ID, "User A," in the user selection dialog 600 of FIG. 6 and selects the job ID (here, "#317"), attached to the secure job information to be deleted, in the job selection dialog 700. The user UA then selects "Delete" in the process selection dialog box 800 of FIG. 8.

The CPU 21 thereby receives information indicating that a deletion process is selected. Thus, upon entering step 535 of the secure job control routine of FIG. 5, the CPU 21 makes the "No" determination in step 535 and enters step 570.

Figure 10:
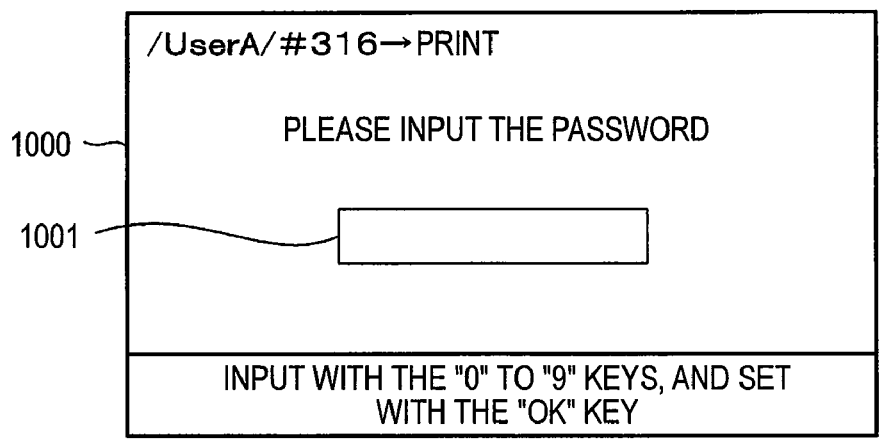
FIG. 10 is a diagram of an image, displayed on the display unit of the image forming device shown in FIG. 1 and prompting a user to input deletion password information.

In step 570, the CPU 21 controls the display panel of the display unit 24 to display thereon a deletion password input dialog 1000 shown in FIG. 10.

The deletion password input dialog 1000 has a deletion password input box (deletion password IB) 1001, similar to the image forming password IB 901. Similarly to the image forming password input dialog 900, the deletion password input dialog 1000 generates information on the input password when the "OK" key of the operation input unit 25 is depressed.

The CPU 21 then enters step 575 and determines whether the user UA has completed input of information based on the deletion password input dialog 1000. In a case where the deletion password input dialog 1000 has not generated password information (the input of information is not completed), the CPU 21 makes the "No" determination in step 575 and stands by in step 575 until the input of information is completed.

When the user UA inputs, as the deletion input information, the same password information (in the present example, the information indicating "1234") as the predefined password information stored in the HDD 32 of the information processing device 30, and thereafter depresses the "OK" key, the CPU 21 receives the password information. The CPU 21 thus makes the "Yes" determination in step 575 and enters step 580 to end the display of the deletion password input dialog 1000. The CPU 21 furthermore determines whether the password information (deletion input information), input based on the deletion password input dialog 1000, matches the deletion authentication information included in the secure job information (selected secure job information), which among the secure job information stored in the RAM 23, includes the user identification information, indicating the user ID, "User A," selected based on the user selection dialog 600, and the job information identification information, indicating the job ID, "#317," selected based on the job selection dialog 700.

When the deletion input information and the deletion authentication information are matched, the CPU 21 makes the "Yes" determination in step 580 and enters step 585 to delete the selected secure job information from the RAM 23 (execute the deletion process). Execution of the respective processes from step 570 to step 585 corresponds to realization of functions of a deletion determining unit. The CPU 21 then enters step 599 and ends the present routine once.

If the password information (deletion input information), input based on the deletion password input dialog 1000 of FIG. 10, does not match the deletion authentication information, included in the selected secure job information, the CPU 21 of the image forming device 20, upon entering step 580, makes the "No" determination in step 580 and then directly enters step 599 to end the present routine once without deleting the secure job information. The deletion authentication information can be considered as information defining the deletion input information to be input by a user into the image forming device 20 when the user desires to delete secure job information stored in the image forming device 20.

A case, where the user UE desires to perform a new secure printing job when the information amount that can be stored anew by the RAM 23 of the image forming device 20 has become extremely low due to the transmission of a plurality of secure job information by the users UA to UD, shall now be described. Here, it shall be presumed that the deletion authentication information included in the secure job information stored in the RAM 23 is the predefined password information in all cases.

In this case, the user UE, as in the case described above, inputs predetermined information in the printing execution dialog 400 of FIG. 4 that is displayed by the CPU 31 of an information processing device 30 executing the job information transmission routine of FIG. 3. The CPU 31 thus transmits secure job information to the image forming device 20 (step 350).

The image forming device 20 thereby receives the secure job information. In a case in which the information amount that the image forming device 20 can store anew in the RAM 23 is less than the information amount of the received secure job information, the CPU 21 makes the "No" determination in step 210 of the job control routine of FIG. 2 and enters step 240 to delete the received secure job information from the buffer memory of the communication interface unit 27 and transmit error notification information to the information processing device 30.

Upon receiving the error notification information, the CPU 31 of the information processing device 30 executes an unillustrated error notification information display routine and thereby controls the display panel of the display unit 34 to display thereon an unillustrated error notification dialog.

The error notification dialog contains a message indicating that the information amount that can be stored anew in the RAM 23 of the image forming device 20 is insufficient. Because the user UE can thereby become aware of a situation that the information amount that can be stored anew in the RAM 23 is insufficient, the user can respond to the situation rapidly. User convenience is thus improved.

Figure 11:
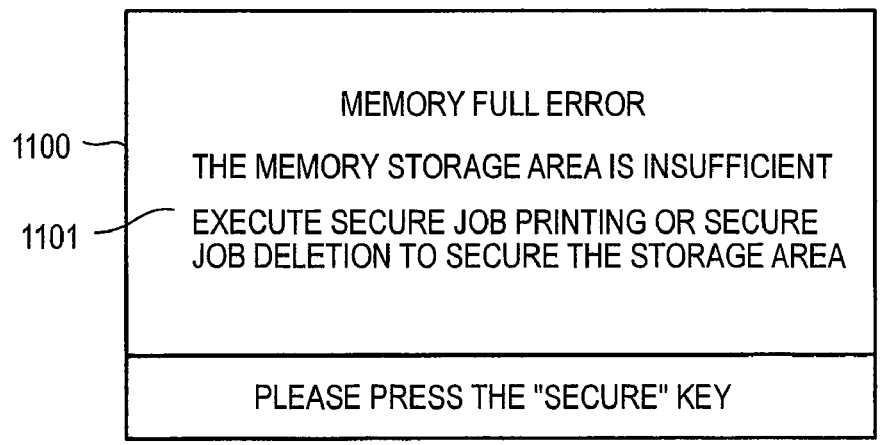
FIG. 11 is a diagram of an image, displayed on the display unit of the image forming device shown in FIG. 1 and notifying to a user that an information amount that can be stored anew in a RAM of the image forming device is insufficient.

The CPU 21 of the image forming device 20 then enters step 245 (see FIG. 2) and controls the display panel of the display unit 24 to display thereon an error dialog 1100 shown in FIG. 11. Thereafter, the CPU 21 enters step 299 and ends the present routine once.

The error dialog 1100 contains a message 1101 indicating that the information amount that can be stored anew in the RAM 23 is insufficient and prompting execution of the image forming process, based on secure job information, which the user UE has transmitted in the past and for which the image forming process has not been executed, or deletion of stored secure job information.

After checking the message 1101, the user UE presses the "Secure" key of the operation input unit 25 of the image forming device 20. The CPU 21 of the image forming device 20 thereby receives the information corresponding to the "Secure" key from the operation input unit 25. Then as described above, the CPU 21 executes the secure job control routine of FIG. 5 to display the user selection dialog 600 of FIG. 6, the job selection dialog 700 of FIG. 7, and the process selection dialog 800 of FIG. 8 in this order while responding to operations of the operation input unit 25 by the user UE (step 510 to step 530).

The user UE selects, in the user selection dialog 600, a suitable user ID among the users UA to UE that constitute the group using the same predefined password information as the deletion password information, and furthermore selects a suitable job ID in the job selection dialog 700. Further, the user UE selects "Delete" in the process selection dialog 800.

The CPU 21 thus makes the deletion password input dialog 1000 (FIG. 10) be displayed in step 570. Using the deletion password input dialog 1000, the user UE inputs the predefined password information. The CPU 21 thus executes the processes of steps 575 to 585 to delete, from the RAM 23, the secure job information (the selected secure job information), which, among the secure job information stored in the RAM 23, includes the user identification information, indicating the user ID selected based on the user selection dialog 600, and the job information identification information, indicating the job ID selected based on the job selection dialog 700.

Thereafter, the user UE retransmits the secure job information by operating the information processing device 30. Because in this case, the information amount that can be stored anew in the RAM 23 of the image forming device 20 is sufficiently high, when the CPU 21 enters step 210 of the job control routine FIG. 2, it makes the "Yes" determination in step 210 to store the received secure job information be stored in the RAM 23 in step 215. The image forming device 20 thus stands by in a state in which the image forming process can be executed based on the secure job information when the information, instructing the execution of the image forming process, and the image forming input information are input by the user UE.

By inputting the predefined password information as the deletion input information, the user UE can delete, from the RAM 23, secure job information, which is secure job information that had been transmitted by another user among the users UA to UD and for which the deletion authentication information is set to the predefined password information. Because the information amount that can be stored anew in the RAM 23 is thereby increased, the user UE can execute a new secure printing job.

A case, where the user UA desires to set the deletion password information to the same password information as the image forming password information, shall now be described. In this case, when the printing execution dialog 400 of FIG. 4 is displayed, the user UA sets the deletion password selection RBs 403 to 405 to the state where the deletion password selection RB 404 is selected, and then depresses the print button 407. The CPU 31 thereby receives selection information indicating that the deletion password information is to be set to the image forming password information.

Thus, when the CPU 31 enters step 365 of the job information transmission routine of FIG. 3, the CPU 31 makes the "No" determination in step 365 and enters step 380 to determine whether it has been designated that the deletion password information is to be set to the image forming password information.

Because in the present state, the CPU 31 has received the selection information indicating that the deletion password information is to be set to the image forming password information, the "Yes" determination is made in step 380, and in step 385, the deletion password information is set to the image forming password information (in the present example, the information indicating "916437"). The execution of the respective processes of step 380 and step 385 corresponds to realization of a portion of the functions of the second transmission unit.

Thereafter, the CPU 31 enters the step 375 and subsequent steps to generate the secure printing header information, transmit the job information, including the generated secure printing header information, to the image forming device 20, and then end the routine of FIG. 3 once.

In the present case, because input of the image forming password information is required even for deleting secure job information from the image forming device 20, a user other than the job transmitting user (the user UA in the present case) cannot delete the secure job information (the secure job information, for which the deletion password information has been set to the same information as the image forming password information). Deletion of the secure job information by a user other than the job transmitting user can thereby be prevented reliably.

A case where the user UA desires to set the deletion password information to input password information shall now be described. In this case, when the printing execution dialog 400 of FIG. 4 is displayed, the user UA sets the deletion password selection RBs 403 to 405 to the state where the deletion password selection RB 405 is selected, inputs password information, indicating a character string constituted of "0" to "9" (in the present example, the character string, "12345," known by the users UA to UC), in the deletion password IB 406, and then depresses the print button 407.

The CPU 31 thereby receives selection information, indicating that the deletion password information is to be set to the input password information, and the password information, input into the deletion password IB 406. The password information input in the deletion password IB 406 may be password information indicating a null character string that does not contain any symbols.

Thus, when the CPU 31 enters step 365 of the job information transmission routine of FIG. 3, the CPU 31 makes the "No" determination in step 365, furthermore makes the "No" determination upon entering step 380, and then enters step 390. In step 390, the CPU 31 sets the deletion password information to the password information (the information indicating "12345") input into the deletion password IB 406. The execution of the process of step 390 corresponds to realization of a portion of the functions of the second transmission unit.

Thereafter, the CPU 31 enters the step 375 and subsequent steps to generate the secure printing header information, transmit the job information, including the generated secure printing header information, to the image forming device 20, and then end the routine of FIG. 3 once.

The user UA can thus readily set the deletion password information to desired password information. The user UA can thus set the deletion password information to password information that can only be input by desired users.

As described above, according to the first example, the information processing device 30 transmits secure job information including the image forming authentication information and the deletion authentication information. The image forming authentication information defines the image forming input information to be input by a user when the user uses the image forming device 20 to execute the image forming process. The deletion authentication information defines the deletion input information to be input by the user when the user uses the image forming device 20 to delete the secure job information.

The image forming authentication information can be set to information corresponding to the image forming input information that can be input only by the user who instructs the transmission of the secure job information (the job transmitting user). Furthermore, the deletion authentication information can be principally set to information corresponding to the deletion input information that can be input by not only the job transmitting user but also users other than the job transmitting user.

An unspecified user other than the job transmitting user can thereby be prevented from viewing the image formed on the recording medium when the image forming process is executed, and yet a specified user other than the job transmitting user can delete the secure job information, stored in the image forming device 20, from the image forming device 20.

Because the information amount that can be stored anew by the image forming device 20 can thus be increased, continuation of a state, in which the image forming device 20 cannot perform a new secure printing job, can be avoided. Furthermore, because the secure job information can be deleted from the image forming device 20 only by users who can input the deletion input information, deletion of arbitrary stored secure job information by an unspecified user can be avoided.

Further, according to the first example, different deletion authentication information can be set according to each secure job information. The job transmitting user can thus set the deletion authentication information, included in a portion of the secure job information, to information corresponding to the deletion input information that only the job transmitting user can input, and to set the deletion authentication information, included in other secure job information, to information corresponding to the deletion input information that can also be input by users other than the job transmitting user.

Thus, when the information amount that the image forming device 20 can store anew becomes too low, the other secure job information can be deleted appropriately while reliably preventing deletion of the portion of the secure job information.

Second Example

An image forming system according to a second example shall now be described. The image forming system according to the second example differs from the image forming system according to the first example only in that in the case where the information amount that can be stored anew in the RAM 23 becomes less than the information amount (threshold amount) of a received secure job information, the image forming device executes deletion of secure job information without requesting a user to input the deletion input information when the deletion of the secure job information is instructed by the user. A description shall now be provided mainly in regard to this point.

Figure 12:
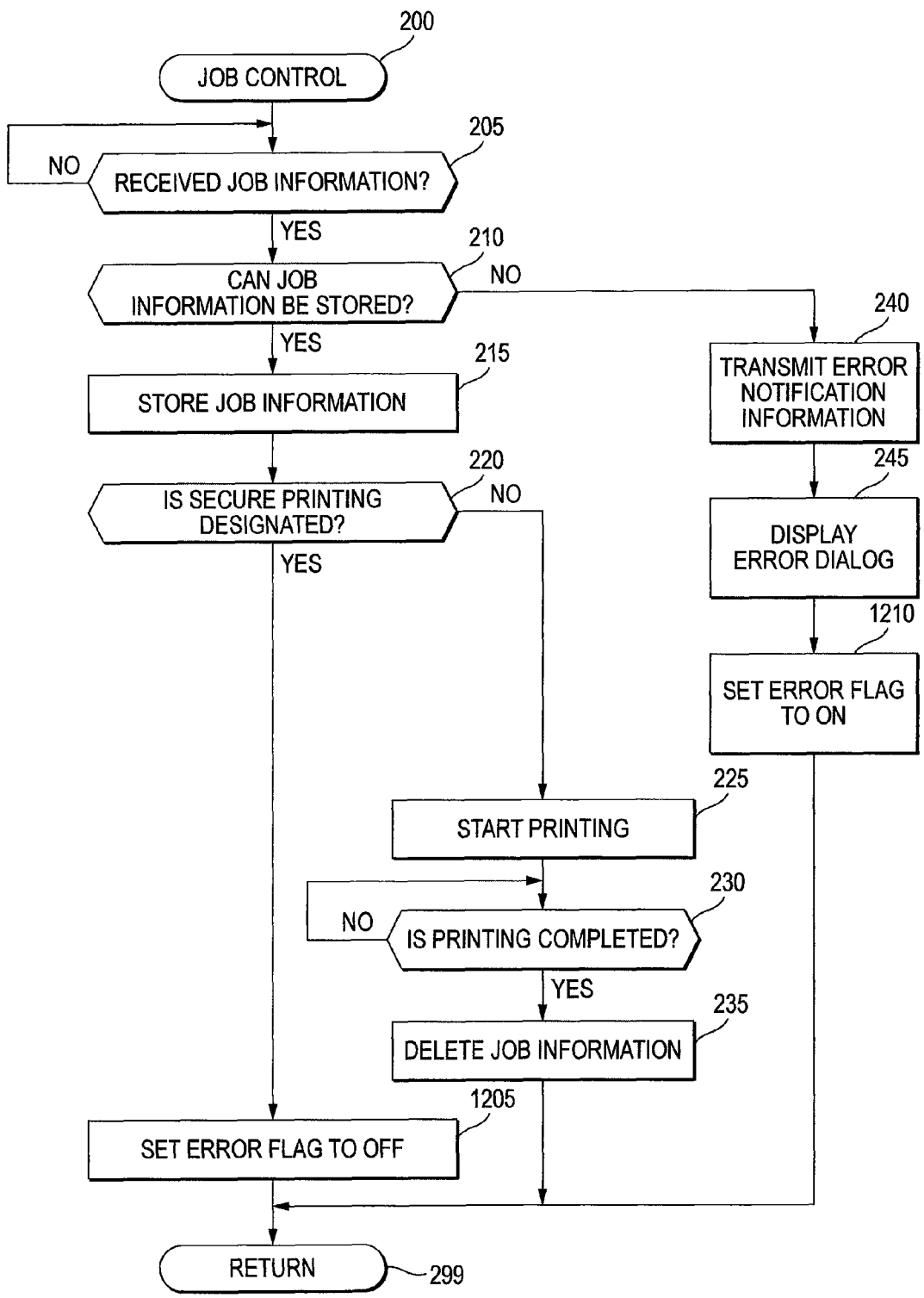
FIG. 12 is a flowchart of a program for performing job control, executed by the CPU of the image forming device, according to a second example.

The CPU 21 of the image forming device 20 according to the second example executes a job control routine, illustrated by a flowchart in FIG. 12, in place of the job control routine of FIG. 2 according to the first example. As shown in FIG. 12, the present job control routine is constructed by adding processes of step 1205 and step 1210 to the job control routine shown in FIG. 2. The execution of the processes of step 1205 and step 1210 corresponds to realization of a portion of the functions of the deletion determining unit.

Figure 5:
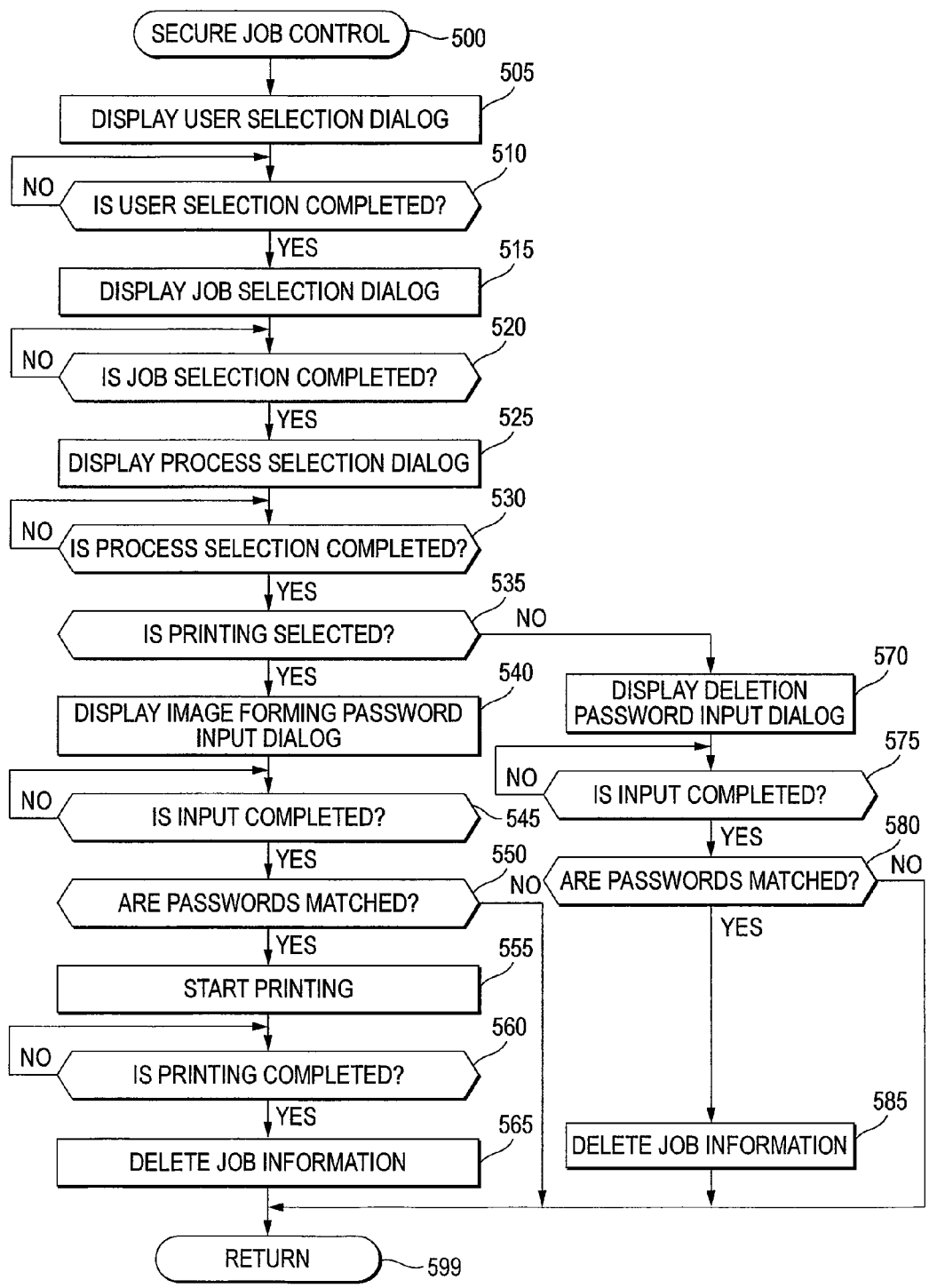
FIG. 5 is a flowchart of a program for performing secure job control, executed by the CPU of the image forming device shown in FIG. 1.
Figure 13:
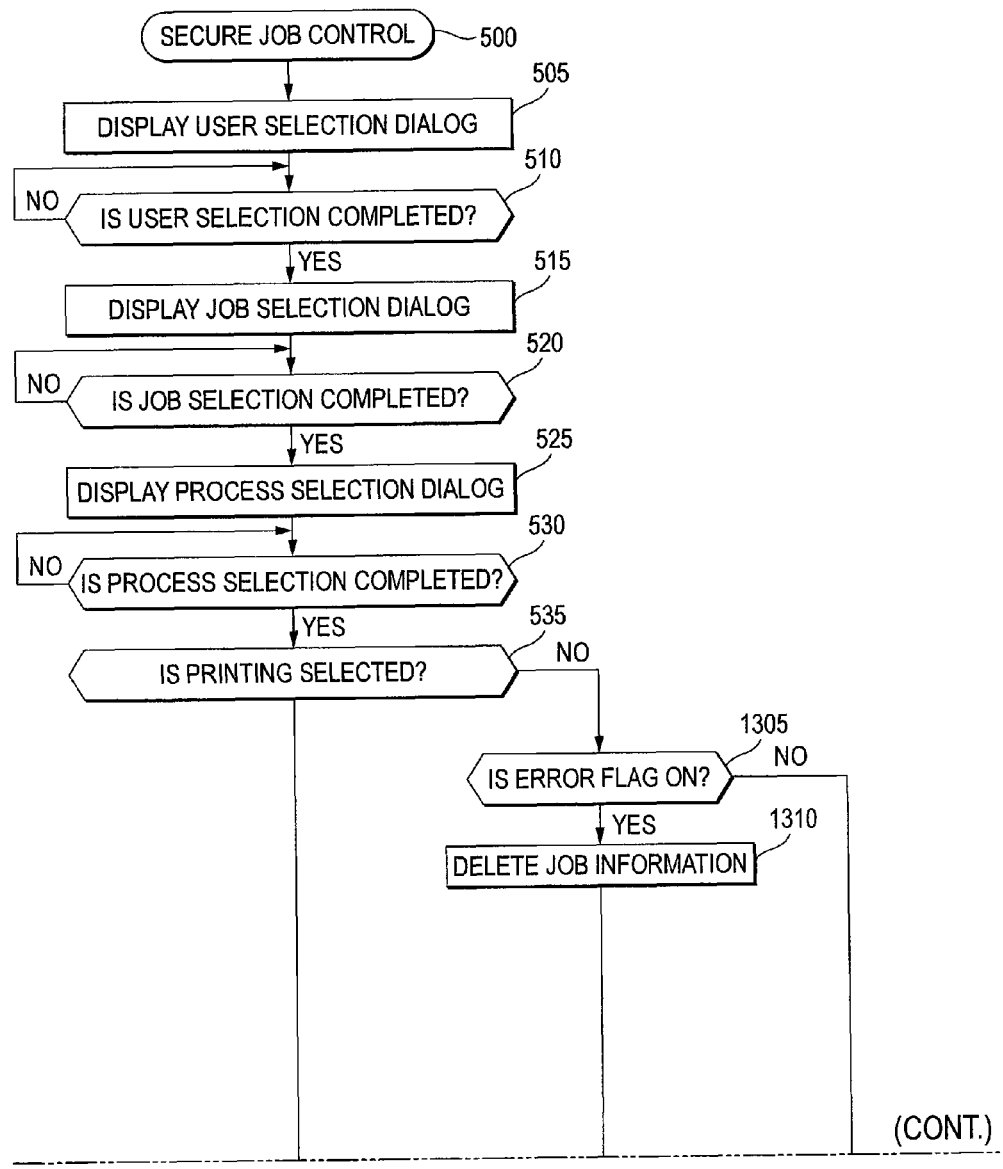
FIG. 13 is a flowchart of a program for performing secure job control, executed by the CPU of the image forming device, according to the second example.

Furthermore, the CPU 21 of the image forming device 20 according to the second example executes a secure job control routine, illustrated by a flowchart in FIG. 13, in place of the secure job control routine of FIG. 5 according to the first example. As shown in FIG. 13, the present secure job control routine is constructed by adding processes of step 1305 and step 1310 to the secure job control routine shown in FIG. 5. The execution of the processes of step 1305 and step 1310 corresponds to realization of a portion of the functions of the deletion determining unit.

Operations of the image forming system according to the second example shall now be described, beginning with a case where the image forming device 20 receives secure job information in a state in which the information amount that can be stored anew in the RAM 23 of the image forming device 20 is comparatively high.

In this case, the CPU 21 of the image forming device 20 makes the "Yes" determination respectively in step 205, step 210, and step 220 of FIG. 12, and after storing the received secure job information in the RAM 23 (step 215), enters step 1205 to set error flag information to off information. Here, the error flag information is flag information indicating whether the information amount that can be stored anew in the RAM 23 is less than or greater than a predetermined threshold amount. The error flag information, when set to on information, indicates that the storable information amount is less than the threshold amount and the error flag information, when set to the off information, indicates that the storable information amount is greater than the threshold amount. The CPU 21 then enters step 299 and ends the present routine once.

A case, where, in this state, the user UE desires to delete secure job information stored in the RAM 23, shall now be described.

In this case, the user UE presses the "Secure" key of the operation input unit 25 of the image forming device 20. The CPU 21 of the image forming device 20 thereby receives the information corresponding to the "Secure" key from the operation input unit 25. The CPU 21 then executes the secure job control routine of FIG. 13 to display the user selection dialog 600 of FIG. 6, the job selection dialog 700 of FIG. 7, and the process selection dialog 800 of FIG. 8 in this order while responding to operations of the operation input unit 25 by the user UE (step 510 to step 530).

The user UE selects a suitable user ID in the user selection dialog 600, and selects a suitable job ID in the job selection dialog 700. Further, the user UE selects "Delete" in the process selection dialog 800.

Thus, when the CPU 21 enters step 535 of FIG. 13, the CPU 21 makes the "No" determination in step 535 and enters step 1305 to determine whether the error flag information is set to the on information. In the present state, the error flag information is set to the off information. The CPU 21 thus makes the "No" determination in step 1305 and enters step 570 to display the deletion password input dialog 1000 in the same manner as in the above-described case.

Then as described above, the CPU 21 deletes, from the RAM 23, the secure job information selected by the user UE based on the user selection dialog 600 and the job selection dialog 700 only when the user UE inputs the same password information as the deletion password information included in the secure job information (step 580 and step 585).

Next, a case, where the image forming device 20 receives secure job information in a state in which the information amount that can be stored anew in the RAM 23 of the image forming device 20 has become extremely low, shall be described.

In this case, when the CPU 21 enters step 210 of the job control routine of FIG. 12, the CPU 21 makes the "No" determination and enters step 240 to delete the received secure job information from the buffer memory of the communication interface unit 27 and transmit, to the information processing device 30, error notification information so that the display unit 34 of the information processing device 30 displays the error notification dialog as described above. The CPU 21 then controls the display panel of the display unit 24 to display thereon the error dialog 1100 shown in FIG. 11.

The CPU 21 then enters step 1210 and sets the error flag information to the on information. Thereafter, the CPU 21 enters step 299 and ends the present routine once.

A case where the user UE desires to delete secure job information stored in the RAM 23 in this state shall now be described.

In this case, the user UE presses the "Secure" key of the operation input unit 25 of the image forming device 20. The CPU 21 of the image forming device 20 thereby receives the information corresponding to the "Secure" key from the operation input unit 25. Then as described above, the CPU 21 executes the secure job control routine of FIG. 13 to display the user selection dialog 600 of FIG. 6, the job selection dialog 700 of FIG. 7, and the process selection dialog 800 of FIG. 8 in this order while responding to operations of the operation input unit 25 by the user UE (step 510 to step 530).

The user UE selects a suitable user ID in the user selection dialog 600, and selects a suitable job ID in the job selection dialog 700. Further, the user UE selects "Delete" in the process selection dialog 800.

Thus, when the CPU 21 enters step 535, the CPU 21 makes the "No" determination in step 535 and enters step 1305 to determine whether the error flag information is set to the on information.

In the present state, the error flag information is set to the on information. The CPU 21 thus makes the "Yes" determination in step 1305 and enters step 1310 to delete the secure job information selected by the user UE based on the user selection dialog 600 and the job selection dialog 700. The CPU 21 then enters step 599 and ends the present routine once.

As described above, according to the second example, when the information amount that can be stored anew by the image forming device 20 becomes less than the predetermined threshold value (the information amount of the received secure job information), secure job information stored in the RAM 23 is deleted according to the instruction of a user without the user having to input the deletion password information (the deletion input information corresponding to the deletion authentication information). That is, the secure job information stored in the RAM 23 is deleted without being based on the deletion authentication information stored in the RAM 23. The user can thereby perform the new secure printing job immediately.

In the second example, it is determined, when job information is received, whether the information amount that can be stored anew in the RAM 23 is greater than the information amount of the job information is determined. Instead, it may be determined, each time a predetermined time elapses, whether the information amount that can be stored anew in the RAM 23 is greater than a threshold value set in advance.

In the second example, secure job information is deleted according to an instruction by a user. Instead, secure job information may be deleted automatically from the RAM 23 without any instruction by a user when the error flag information is set to the on information.

In the second example, when the information amount that can be stored anew by the image forming device 20 becomes less than the predetermined threshold value, secure job information can be deleted without a user having to input password information.

Instead, the image forming device 20 may be modified so that the image forming device 20 stores predefined deletion password information in advance and that in the case where the information amount that can be stored anew by the image forming device 20 becomes less than the predetermined threshold value, the image information device 20 deletes secure job information when a user inputs the predefined deletion password information.

The present invention is not restricted to the respective examples described above and various modification examples can be employed within the scope of the present invention. For example, although the respective examples are arranged so that the information processing device 30 transmits the secure job information including the deletion authentication information, the examples may instead be arranged so that the information processing device 30 transmits the secure job information without including the deletion authentication information and the image forming device 20 stores the deletion authentication information in advance.

The respective examples may also be arranged so that when the deletion password information, included in the secure job information selected by a user as an object to be deleted from the RAM 23, is information indicating a null character string, the secure job information is deleted from the RAM 23 without displaying the deletion password input dialog 1000 of FIG. 10 by the image forming device 20.

Furthermore, although the respective examples use password information as the image forming input information and the deletion input information, biometric information, based on a shape of a face, a fingerprint, a shape of a vein, etc., or information recorded on a card with an IC chip (IC card) may be used instead. In this case, preferably the biometric information or the information recorded in the IC card is used as the image forming information, and password information is used as the deletion input information.

In addition, the respective examples may be arranged so that when the information amount that can be stored anew in the RAM 23 becomes less than the predetermined threshold value, the image forming device 20 automatically selects secure job information without selection of secure job information by a user. In this case, the respective examples are preferably arranged so that secure job information is selected in an order starting from secure job information of older time of reception by the image forming device 20.

As discussed above, the present invention can provide at least the following illustrative, non-limiting embodiments:

(1) An image forming system including an information processing device configured to transmit secure job information including image forming information; and an image forming device configured to store the secure job information transmitted from the information processing device, to execute an image forming process based on the stored image forming information and to delete the stored secure job information.

The information processing device can generate the secure job information to include predetermined image forming authentication information therein.

The image forming device includes: an execution determining unit configured to receive input of predetermined image forming input information. When the image forming input information is input, the execution determining unit can determine, based on the input image forming input information and the image forming authentication information included in the stored secure job information, whether to execute the image forming process based on the image forming information included in the secure job information. The image forming device further includes a deletion determining unit configured to store predetermined deletion authentication information and to receive input of predetermined deletion input information. When the deletion input information is input, the deletion determining unit can determine, based on the input deletion input information and the stored deletion authentication information, whether to delete the secure job information.

According to the system of (1), the image forming authentication information and the deletion authentication information can be set so that the image forming input information, to be input by a user to execute the image forming process using the image forming device, and the deletion input information, to be input by the user to delete secure job information using the image forming device, differ from each other. Thus, for example, the image forming authentication information can be set to information corresponding to image forming input information that only the user (job transmitting user), who instructs transmission of the secure job information, can input. Furthermore, the deletion authentication information can be set to information corresponding to deletion input information that can be input even by predetermined users other than the job transmitting user.

An image that is formed on a recording medium when the image forming process is executed can thereby be prevented from being viewed by an unspecified user other than the job transmitting user, and yet a specified user (for example, a user permitted by the job transmitting user to delete the secure job information transmitted by the job transmitting user) other than the job transmitting user can delete, using the image forming device, the secure job information stored in the image forming device. Because an information amount that can be stored anew in the image forming device can thus be increased, continuation of a state in which the image forming device cannot perform a new secure printing job can be avoided. Furthermore, because only a user, who can input deletion input information, can delete secure job information using the image forming device, deletion of arbitrary stored secure job information by an unspecified user can be avoided.

(2) The system of (1), in which the information processing device is configured to transmit the deletion authentication information, to be stored by the deletion determining unit of the image forming device, to the image forming device.

According to the system of (2), the user can use the information processing device to set the deletion authentication information to be stored in the image forming device. User convenience can thus be improved.

(3) The system of (2) in which, the information processing device is configured to generate the secure job information to further include therein the deletion authentication information to be stored by the deletion determining unit of the image forming device.

According to the system of (3), the deletion authentication information can be set to information that differs according to the secure job information. The job transmitting user can thereby set the deletion authentication information, included in a portion of the secure job information, to information corresponding to deletion input information that only the job transmitting user can input, and can set the deletion authentication information, included in other secure job information, to information corresponding to deletion input information that can also be input by users other than the job transmitting user.

Thus, when the information amount that the image forming device can store anew becomes too low, the other secure job information can be deleted appropriately while reliably preventing deletion of the portion of the secure job information.

(4) An information processing program which is to be executed by an information processing device configured to communicate via a communication line with an image forming device configured to store secure job information including image forming information, to execute an image forming process based on the stored image forming information and to delete the stored secure job information.

The information processing program includes: a first transmitting procedure of generating the secure job information to include therein image forming authentication information that defines image forming input information to be input into the image forming device by a user to execute the image forming process using the image forming device, and transmitting the secure job information to the image forming device; and a second transmitting procedure of transmitting, to the image forming device, deletion authentication information defining deletion input information to be input into the image forming device by the user to delete the stored secure job information using the image forming device.

(5) The program of (4), in which the first transmitting procedure and the second transmitting procedures includes generating the secure job information to include therein both the image forming authentication information and the deletion authentication information and then transmitting the secure job information.

(6) The program of (4) or (5), in which the deletion authentication information is password information indicating a character string made up of symbols including characters and/or numerals, or a null character string not including any symbols.

According to the program of (6), the deletion authentication information can be constituted of password information.

(7) The program of (6), in which the second transmitting procedure includes transmitting, in accordance with an instruction of the user, predefined password information, stored in the information processing device, as the deletion authentication information.

According to the program of (7), the user can set the deletion authentication information to the predefined password information without having to input the password information. The user is thus free from the trouble of inputting the password information. Furthermore, the deletion authentication information can be prevented from being set to password information that is not intended by the user due to input error by the user, etc.

(8) The program of (6), in which the second transmitting procedure includes transmitting password information, input by the user, as the deletion authentication information.

According to the program of (8), the user can readily set the deletion authentication information to desired password information.

(9) The system of (1), in which the deletion determining unit is configured to determine deletion of the stored secure job information without being based on the stored deletion authentication information when an information amount that can be stored anew by the image forming device becomes less than a predetermined threshold amount.

According to the system of (9), when the information amount that can be stored anew by the image forming device becomes less than the predetermined threshold amount, the stored secure job information is deleted, for example, according to an instruction by the user even if the user does not input the deletion input information corresponding to the deletion authentication information. The user can thereby perform a new secure printing job immediately. The deletion determining unit may be configured to automatically delete the stored secure job information when the information amount that can be stored anew by the image forming device becomes less than the predetermined threshold amount.

(10) An image forming device configured to communicate via a communication line with an information processing device that can transmit secure job information including image forming information, to store the secure job information transmitted from the information processing device, to execute an image forming process based on the stored image forming information, and to delete the stored secure job information, the secure job information further including predetermined image forming authentication information.

The image forming device includes: an execution determining unit configured to receive input of predetermined image forming input information. When the image forming input information is input, the execution determining unit can determine, based on the input image forming input information and the image forming authentication information included in the stored secure job information, whether to execute the image forming process based on the image forming information included in the secure job information. The image forming device further includes a deletion determining unit configured to store predetermined deletion authentication information and to receive input of predetermined deletion input information. When the deletion input information is input, the deletion determining unit can determine, based on the input deletion input information and the stored deletion authentication information, whether to delete the stored secure job information.

(11) The device of (10), in which the secure job information further includes the deletion authentication information, and the deletion determining unit is configured so that when the deletion input information is input, the deletion determining unit can determine, based on the input deletion input information and the deletion authentication information included in the stored secure job information, whether to delete the secure job information.

What is claimed is:
1. An image forming system comprising:
an information processing device including:
a generator configured to generate secure job information including image forming information and image forming authentication information; and
a transmitter configured to transmit the secure job information; and an image forming device including:
- a receiver configured to receive the secure job information;
- a storage configured to store the secure job information and deletion authentication information;
- an operation input unit configured to receive input image forming input information and deletion input information;
- a processing unit;
- memory having machine-readable instructions stored thereon that, when executed by the processing unit, cause the image forming device to perform steps including:
  - determining, based on the image forming authentication information and the image forming input information, whether the image forming device executes an image forming process based on the image forming information; and
  - determining, by using the deletion authentication information and the deletion input information, whether the image forming device deletes the secure job information from the storage,
- wherein the deletion authentication information is different from the image forming authentication information.

2. The system according to claim 1, wherein the transmitter is configured to transmit the deletion authentication information, and the receiver is configured to receive the deletion authentication information.

3. The system according to claim 2, wherein the generator is configured to generate the secure job information further including the deletion authentication information.

4. The system according to claim 1, wherein the determining whether the image forming device deletes the secure job information from the storage includes (a) determining whether an amount of information available for the storage to store new information is less than a predetermined threshold value, and (b) determining deletion of the secure job information from the storage without referring to the deletion authentication information when the amount of information is less than the predetermined threshold value.

5. A non-transitory medium readable by an information processing device and having an information processing program stored thereon, wherein the program, when executed by the image processing device communicable with an image forming device, causes the image processing device to perform operations comprising the steps of:
(a) generating secure job information including image forming information and image forming authentication information, wherein the image forming authentication information is to be used by the image forming device to determine whether the image forming device executes an image forming process based on the image forming information;
(b) transmitting the secure job information to the image forming device; and
(c) transmitting deletion authentication information to the image forming device, wherein the deletion authentication information is to be used by the image forming device to determine whether the image forming device deletes the secure job information therefrom,
wherein the deletion authentication information is different from the image forming authentication information.

6. The non-transitory medium according to claim 5, wherein the step (a) includes generating the secure job information including the image forming authentication information and the deletion authentication information, and the step (c) is included in the step (b).

7. The non-transitory medium according to claim 5, wherein the deletion authentication information includes password information indicative of a character string or a null character string, the character string having symbols of characters and/or numerals, the null character string not having any symbols.

8. The non-transitory medium according to claim 7, wherein the step (c) includes transmitting predefined password information stored in the image processing device to the image forming device as the password information of the deletion authentication information.

9. The non-transitory medium according to claim 7, wherein the step (c) includes transmitting arbitrary password information input to the image processing device to the image forming device as the password information of the deletion authentication information.

10. An image forming device comprising:
- a receiver configured to receive secure job information including image forming information and image forming authentication information;
- a storage configured to store the secure job information and deletion authentication information;
- an operation input unit configured to receive input image forming input information and deletion input information;
- a processing unit;
- memory having machine-readable instructions stored thereon that, when executed by the processing unit, cause the image forming device to perform steps comprising:
  - determining, based on the image forming authentication information and the image forming input information, whether the image forming device executes an image forming process based on the image forming information; and
  - determining, by using the deletion authentication information and the deletion input information, whether the image forming device deletes the secure job information from the storage,
- wherein the deletion authentication information is different from the image forming authentication information.

11. The image forming device according to claim 10, wherein the deletion authentication information is included in the secure job information, and the determining whether the image forming device deletes the secure job information from the storage includes obtaining the deletion authentication information from the secure job information.

* * * * *